United States Patent [19]
McKee

[11] 3,949,960
[45] Apr. 13, 1976

[54] BRACKET SYSTEM FOR MOUNTING RETRACTABLE AWNINGS

[75] Inventor: Donald S. McKee, Louisville, Colo.

[73] Assignee: The Scott & Fetzer Company, Lakewood, Ohio

[22] Filed: Mar. 24, 1975

[21] Appl. No.: 561,366

[52] U.S. Cl. ............ 248/225; 248/251; 248/DIG. 9
[51] Int. Cl.² .................... A47F 5/00; E06B 7/28
[58] Field of Search.... 52/588, 630; 135/5 A, 5 AT; 248/207, 237, 223, 224, 225, 251, 261, 262, 265–267, 269, 273, 295, 298, 300, 309, 316 R, 316 A, 316 C, DIG. 9

[56] References Cited
UNITED STATES PATENTS

| 926,506 | 6/1909 | Nagel | 248/251 |
|---|---|---|---|
| 2,103,106 | 12/1937 | Yurkovitch | 248/224 |
| 3,049,198 | 8/1962 | Dobbins et al. | 52/630 |
| 3,128,851 | 4/1964 | Deridder et al. | 52/630 X |
| 3,464,480 | 9/1969 | Kuss | 248/273 X |
| 3,502,222 | 3/1970 | Crafoord | 248/244 X |
| 3,671,000 | 6/1972 | Williams | 248/225 X |
| 3,751,868 | 8/1973 | Mascioletti | 52/588 X |
| 3,795,380 | 3/1974 | Turner | 248/223 X |
| 3,845,927 | 11/1974 | Bratschi | 248/223 |
| 3,866,874 | 2/1975 | Upton | 248/251 |

Primary Examiner—Roy D. Frazier
Assistant Examiner—Lawrence J. Staab
Attorney, Agent, or Firm—Burton, Crandell & Polumbus

[57] ABSTRACT

A bracket system for mounting the box or housing of retractable roll-up awnings on curved or straight sides of recreational vehicles. The bracket system includes a generally L-shaped mounting bracket for supporting the awning housing, bracket clamps for securing the housing to the mounting bracket, and an adaptor bracket for supporting the mounting bracket on a variety of curved sloping surfaces such as exterior walls of recreational vehicles. The bracket clamp engages with the mounting bracket by means of a dovetail mortise and tenon joint while the awning housing is secured to the mounting bracket and bracket clamp by tongue and groove engagement. The mounting bracket is supported on the adaptor bracket by a keyhole mortise and tenon joint in cooperation with a tongue and groove joint. The adaptor bracket is designed to provide a plurality of mounting positions in order to accomodate the mounting bracket to a wide variety of curved walls or surfaces on recreational vehicles.

9 Claims, 14 Drawing Figures

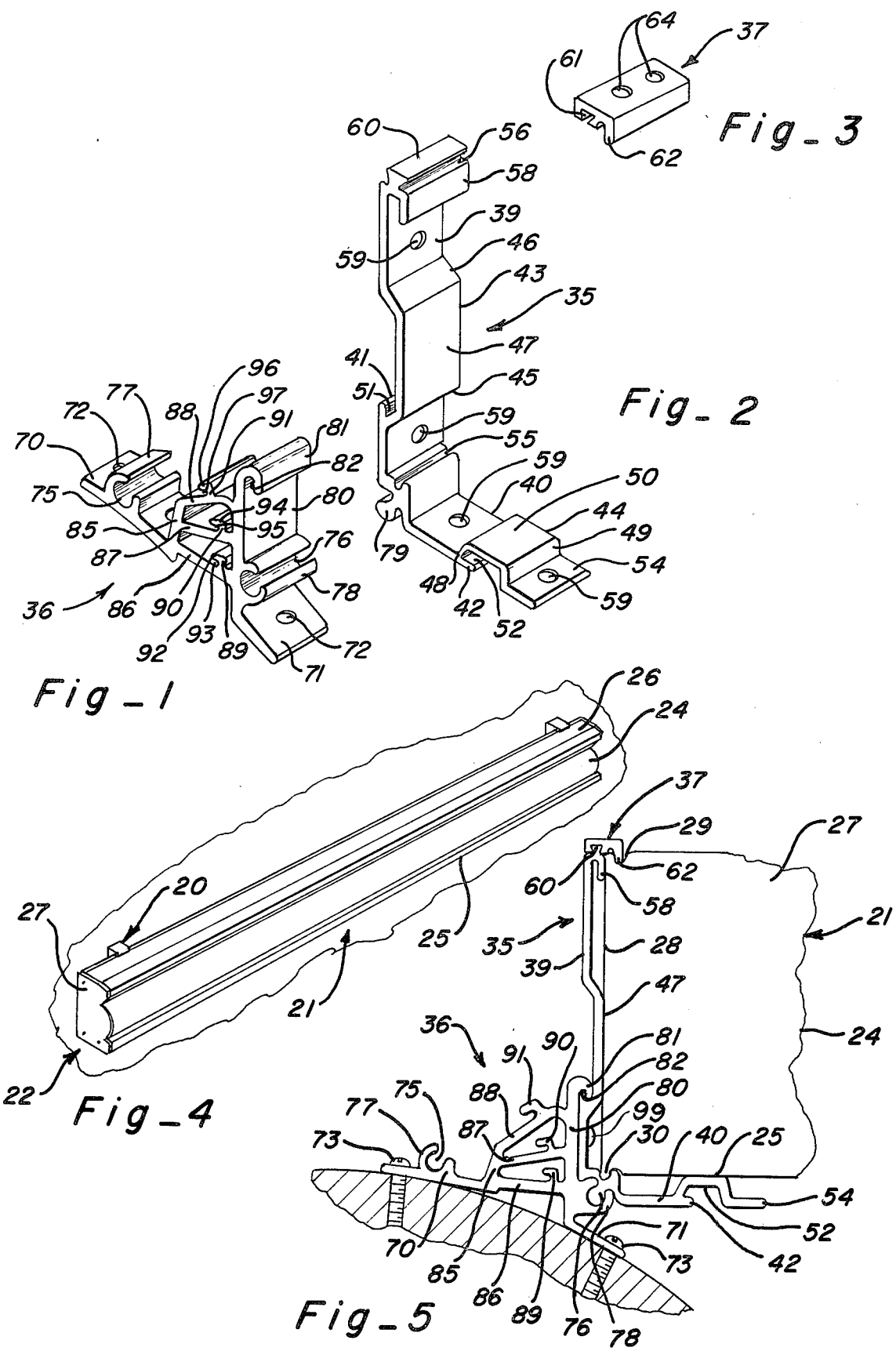

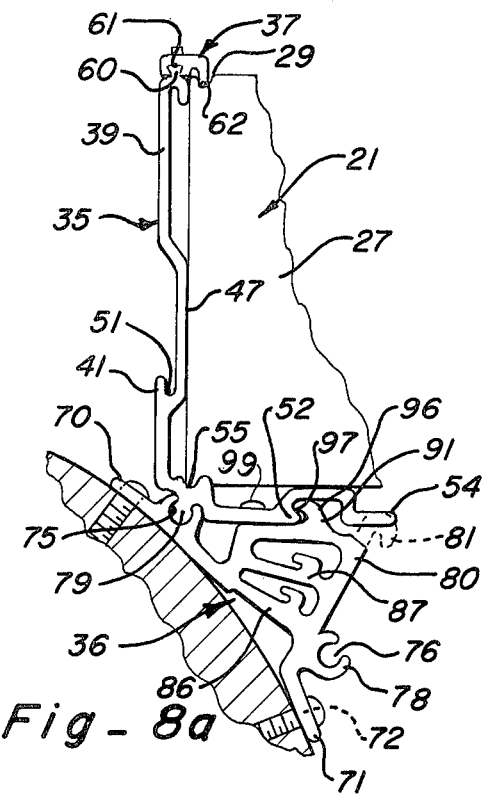
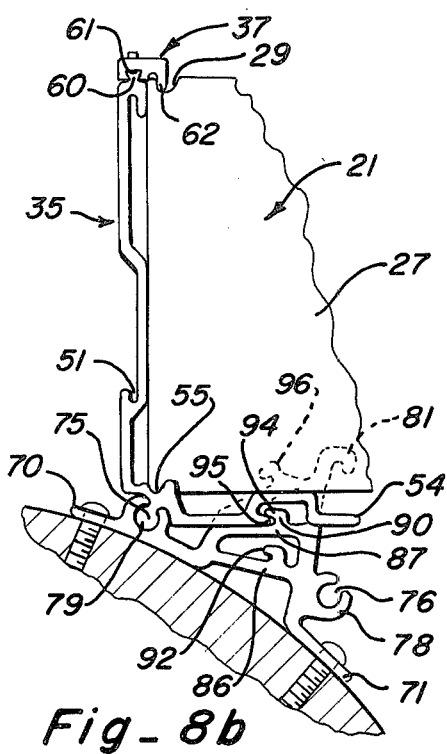
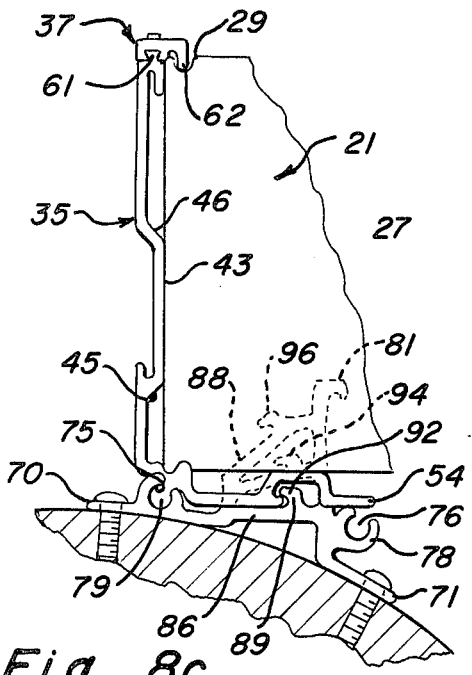
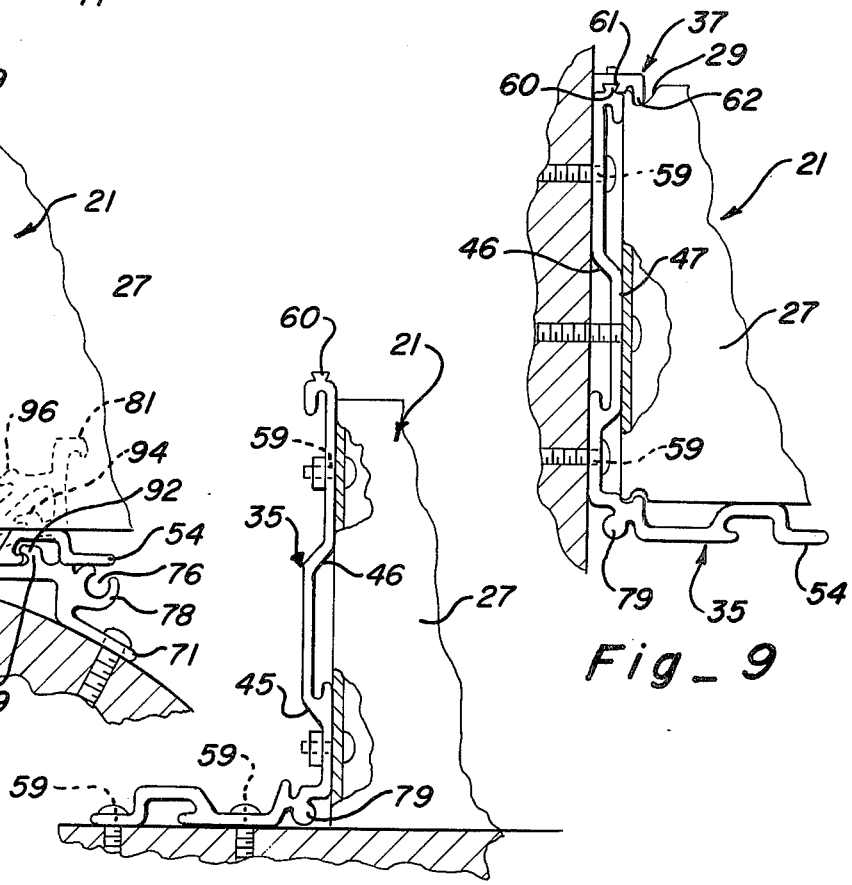

3,949,960

BRACKET SYSTEM FOR MOUNTING RETRACTABLE AWNINGS

FIELD OF THE INVENTION

The present invention relates to a mounting bracket system for mounting framed or enclosed retractable awning structures, and finds particular but not necessarily exclusive utility for mounting such awning structures on recreational vehicles.

BACKGROUND OF THE INVENTION

Retractable awning structures in which the awning is mounted in a frame, housing or box find wide spread commercial utility for use on recreational vehicles as well as on permanent structures. Such retractable awning assemblies conventionally include a closable housing or box adapted to be mounted upon a wall such as a wall of a recreational vehicle, a building structure, or the like, and a flexible sheet of awning material which can be rolled up and stored within the housing or pulled out to a extended awning position. The awning, when extended, is supported by an appropriate brace structure, and the brace members are conventionally housed within the box or housing when the awning is in a stored position. Awnings of this type are shown in co-pending U.S. patent application of Donald S. McKee, Ser. No. 522,640, filed Nov. 11, 1974, for "Enclosable Retractable Awnings"; U.S. Pat. No. 3,364,973, issued Jan. 23, 1968, to R. E. Railson for "Retractable Awning"; and U.S. Pat. No. 3,833,011, issued Sept. 3, 1974, to D. D. Duffy for "Retractable Awning Assembly." Such awning structures are readily mountable upon vertical walls, such as the side wall of a trailer, camper or other recreational vehicle, by fastening the awning housing or frame directly to the wall. Problems are encountered, however, in the case of many recreational vehicles, such as trailers, which have convexly curved walls of such configuration that a planar vertical surface is not available for mounting the awning structure. Because of the wide variety of recreational vehicle configurations, the possible wall curvature configurations on which awnings are to be mounted varies widely.

OBJECTS OF THE INVENTION

It is the principal object of the present invention to provide an improved mounting bracket organization for securing boxed or framed roll-up type awning structures to recreational vehicles, permanent walls and the like.

Another object of the present invention is to provide an improved mounting bracket system for securing boxed or framed roll-up awning structures to curved or non-planar surfaces.

Still another object of the present invention is to provide an awning mounting bracket system of the foregoing character which is readily adaptable to a variety of mounting surface curvatures that is which is not limited for use with a given surface curvature. More specifically, it is an object of the invention to provide a mounting bracket system which can be utilized for both vertical and convexly curved surfaces, and in addition can be utilized to support an awning structure of the above character on a top surface so that the awning structure overhangs a generally vertical wall.

A more detailed object is to provide a mounting bracket system of the foregoing character, the parts of which can be rapidly and efficiently produced as extrusions and can be modified for use with a particular surface configuration by means of ordinary hand tools.

Still a further object of the present invention is to provide a mounting bracket system which is strong, rugged, provides a rigid support for the awning frame or box, and yet which is readily and easily installed on the recreational vehicle or other wall structure on which the awning is to be mounted.

Other objects and advantages of the present invention will become apparent as the following description proceeds, taken in connection with the accompanying drawings.

DESCRIPTION OF THE DRAWINGS

FIG. 1 is an isometric view of a wall mounted adaptor bracket forming a part of the present invention.

FIG. 2 is a isometric view of an awning housing mounting bracket forming a part of the present invention and adapted to be mounted in association with the adaptor bracket shown in FIG. 1.

FIG. 3 is an isometric view of a bracket clamp forming a part of the present invention and adapted to be utilized in conjunction with the awning housing mounting bracket shown in FIG. 2.

FIG. 4 is an isometric view of a roll-up awning housing mounted on a curved wall of a recreational vehicle by the bracket system shown in FIGS. 1, 2 and 3.

FIG. 5 is an elevation view of the bracket system embodying the brackets shown in FIGS. 1, 2 and 3 supporting a roll-up awning box on a slightly sloping curved wall.

FIGS. 8a, 8b and 8c illustrate the bracket system embodying the brackets shown in FIGS. 1, 2 and 3 mounting a roll-up awning box on a curved surface having an average slope varying between about 10° and about 40° with respect to the horizontal.

FIG. 9 illustrates the awning mounting bracket shown in FIG. 2 supporting a roll-up awning box on a vertical surface.

FIG. 10 illustrates the awning mounting bracket shown in FIG. 2 supporting a roll-up awning box on a horizontal surface to overhang a vertical surface.

SUMMARY OF THE INVENTION

Figure 6:
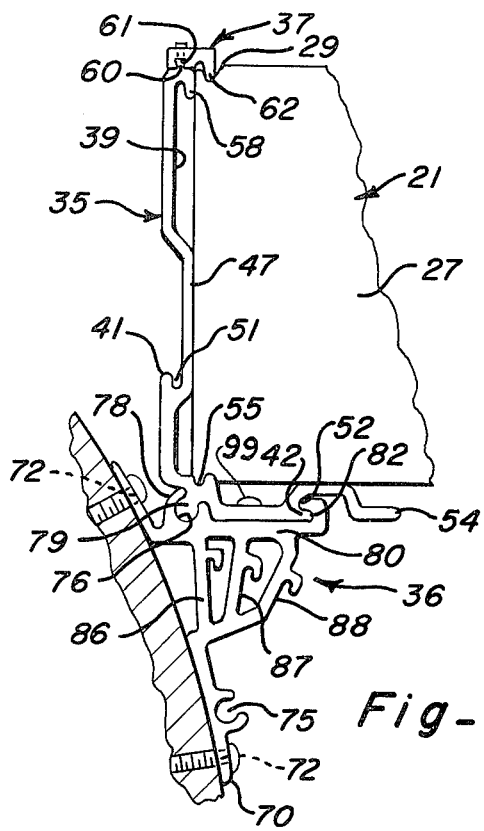
FIG. 6 is an elevation view of the bracket system embodying the brackets shown in FIGS. 1, 2 and 3 supporting a roll-up awning box on a steeply sloping curved wall.

In accordance with the foregoing objects and as shown in accompanying drawings, the present invention is embodied in a bracket system for mounting the box or housing of retractable roll-up awnings on curved or straight sides of recreational vehicles. The bracket system includes a generally L-shaped mounting bracket for supporting the awning housing, bracket clamps for securing the housing to the mounting bracket, and an adaptor bracket for supporting the mounting bracket on a variety of curved sloping surfaces such as exterior walls of recreational vehicles. The bracket clamp engages with the mounting bracket by means of a dovetail mortise and tenon joint while the awning housing is secured to the mounting bracket and bracket clamp by tongue and groove engagement. The mounting bracket is supported on the adaptor bracket by a keyhole mortise and tenon joint in cooperation with a tongue and groove joint. The adaptor bracket is designed to provide a plurality of mounting positions in order to accomodate the mounting bracket to a wide variety of curved walls or surfaces on recreational vehicles.

The mounting bracket supports the awning box and is formed generally in the shape of an "L" with means on the exterior of each of the legs defining a tongue and groove and with a keyhole type tenon at the apex. At the outer end of the longer leg there is provided a dovetail tenon engageable with a dovetail mortise in the bracket clamp. The bracket clamp includes a depending tongue for engagement with a groove in the awning box, while the awning box includes a depending tongue adjacent its back panel engageable with a groove defined in the interior angle of the L-shaped awning mounting bracket. Where the mounting surface is vertical, the mounting bracket can be fastened directly to the wall. Where the wall on which the awning is to be mounted is curved, an adaptor bracket is provided for supporting the mounting bracket. The adaptor bracket is provided with a generally arcuate base formed by opposed flanges. Keyhole type mortises are provided adjacent each flange for selectively receiving the keyhole type tenon on the mounting bracket. The mounting bracket is further secured to the adaptor bracket by tongue and groove connectors formed by L-shaped members on the adaptor bracket engageable with the tongue and groove members on the exterior of each of the mounting bracket legs. A plurality of such tongue and groove elements are provided on the adaptor bracket in order to adapt the system to a wide variety of surface curvatures.

DESCRIPTION OF THE PREFERRED EMBODIMENT

The awning support bracket system embodying the present invention is adapted primarily for mounting the box, frame or housing of an enclosed retractable awning on a wall such as on a side wall of recreational vehicle. The enclosed retractable awning is of the type wherein the component working parts of the awning can be folded into a box-type enclosure mounted upon the recreational vehicle, building structure or the like to conceal the working components of the awning and protect them from the ambient environment. Such awnings are designed so that they can be quickly and easily moved between a retracted storage position within the box or housing and an extended use position. Referring to FIG. 4, the retractable awning includes an elongated box or housing 21 supported on a wall 22, such as the side panel of a recreational vehicle, by the bracket system 20 embodying the present invention. For illustrative enclosed awnings, reference should be made to the above-mentioned U.S. patent application Ser. No. 522,640, U.S. Pat. No. 3,364,973 or U.S. Pat. No. 3,833,011. Briefly, such an elongated box or housing conventionally includes an outer panel or cover which is movable between closed and open positions to allow the working components of the awning to be quickly and easily removed from or positioned within the housing. The housing further includes bottom and top panels 25, 26, end panels 27 and a back panel 28 completing the box or housing structure. For use with the mounting bracket system embodying the present invention, the top panel 26 defines a groove 29 adjacent the rear or back panel 28 while the back panel 28 defines a depending tongue 30 adjacent the bottom panel 25. The tongue 30 and groove 29 may be formed on the awning box 21 in any suitable manner and with any suitable structure so as to be compatible with the bracket mounting system. For example, the tongue and groove structures may be defined simply by spaced slots or apertures cut through the top and bottom panels 25, 26. Alternatively, the box panels may be specially shaped to define the tongue and groove elements, or further separate pieces or panels may be secured to the top, bottom and rear panels to define said tongue and groove structures.

The mounting bracket system 20 embodying the present invention is comprised of three parts. Referring to FIGS. 1, 2 and 3, the bracket system comprises a generally L-shaped mounting bracket 35 (FIG. 2) for directly supporting the awning box, frame or housing; a wall mountable adaptor bracket indicated generally at 36 (FIG. 1) for supporting the awning housing mounting bracket 35; and a bracket clamp or slide indicated generally at 37 (FIG. 3) for securing the awning box or housing to the mounting bracket 35. The mounting bracket 35, adaptor bracket 36, and bracket clamp 37 are assembled together to support the awning box or housing 21 on a generally curved surface as shown in FIGS. 5, 6, 7a, 7b, 7c, 8a, 8b and 8c. Alternatively, the mounting bracket 35 and bracket clamp 37 are assembled together to support an awning box or housing 21 on either a generally vertical surface, as shown in FIG. 9, or on a generally horizontal surface, as shown in FIG. 10. The bracket system thus provides a substantially universal mounting system by means of which the awning box or housing can be supported securely and rigidly on a wide variety of curved or straight surfaces.

For directly supporting the awning box, the mounting bracket 35 is generally formed in the shape of an "L" having a longer leg 39 and a shorter leg 40 joined at an apex. Each of the legs is shaped to define on their outersurface a tongue 41, 42, respectively, directed away from the apex. To this end, each of the legs is provided with an insert portion 43, 44, respectively, with the respective tongues 41, 42 being defined by a continuation of the portion of the legs adjacent the apex. The insert portion 43 of the longer leg 39 is defined by spaced inturned panels 45, 46 and a central panel 47. Similarly, the inset portion 44 of the shorter leg 40 is defined by spaced inturned panels 48 and 49 and a central panel 50. The central panel 47 and the tongue 41 on the leg 40 define therebetween a channel 51 while the central panel 50 and the tongue 42 on the shorter leg 40 define therebetween a channel 52.

At its outer extremity the shorter leg 40 defines a mounting flange 54. The interior included angle of the L-shaped bracket between the legs 39 and 40 defines a groove or slot 55 opening generally parallel to the longer leg 39. The outer extremity of the longer leg 39 is turned inwardly, defining an end panel 56 and a reverse panel 58 in the same plane as the central panel 47. Appropriate apertures 59 are provided in the legs 39 and 40 for receiving fasteners such as screw, bolts and the like by means of which either of the legs may be engaged to a selected wall, such as one side wall of a recreational vehicle as shown in FIG. 4.

For engagement with the bracket clamp 37 (FIG. 3), the inturned panel 56 of the longer leg 39 is provided with a dovetail tenon 60. The bracket clamp 37 is in turn provided with a corresponding mating dovetail slot or mortise 61. In addition, the bracket clamp is formed with a depending tongue 62 adapted to engage in an appropriate groove or slot in the upper panel 26 of the awning housing 21 when the base tongue 30 on the awning housing 21 is received in the apex slot 55 as shown in FIG. 5.

The mounting bracket 35 is adapted for mounting either on a vertical wall, as shown in FIG. 9, or on a horizontal wall or panel as shown in FIG. 10. In the first case, the awning bracket is secured to the vertical wall by means of fasteners extending through the apertures 59. The awning housing or box is supported on the shorter leg 40 and rests on the central panel 50 with the depending housing tongue 30 thereon engaged in the slot 55 on the mounting bracket. The bracket clamp 37 is engaged in a slot or groove 29 in the upper surface of the awning box, and slid onto the dovetail tenon 60. The bracket clamp is secured tightly in place by means of self-tapping or set screws 64 extending through its upper surface into the mortise 61 for engagement with the tenon 60. As the bracket clamp is secured to the bracket 35, it tightly clamps and secures the awning box in place. The awning box can be further secured by a bolt or fastener extending through the back panel 28, the central panel 47 of the mounting bracket and through or into the wall on which the bracket is mounted as shown in FIG. 9.

When the awning box is mounted on a horizontal surface, such as the top of a vehicle, so that it is flush with or overhangs a vertical panel, the shorter leg 40 of the mounting bracket is secured to the horizontal surface or top panel of the vehicle by appropriate fasteners 66, as shown in FIG. 10. The awning box is then bolted or otherwise fastened with appropriate fasteners 67 to the vertical leg portion 39 of the mounting bracket 35, also as shown in FIG. 10.

For mounting the awning box on a generally curved surface, such as, for example, the curved surface of an "Airstream" type house trailer, or similar trailer, camper or other recreational vehicle construction, the adaptor bracket 36 (FIG. 1) is utilized to adapt the mounting bracket 35 to the curved wall. To this end, the adaptor bracket 36 is provided with a generally concave arcuate base defined by opposed flange members 70, 71, each of which is provided with a fastener receiving aperture 72 through which appropriate fasteners 73 may be inserted (FIG. 5) for mounting the adaptor bracket on the curved wall or surface. The adaptor bracket further includes a pair of keyhole type mortises 75, 76 adjacent each of the flanges 70, 71, respectively, which mortises are defined by generally C-shaped members 77, 78, respectively extending transversely of the flanges 70, 71. The keyhole mortises 75, 76 are adapted to receive selectively a complimentary keyhole shaped tenon 79 secured at the exterior apex of the L-shaped bracket 35. As will be readily perceived, the opening of the C-shaped member 77 defining the mortise 75 is of sufficient width to afford latitude for limited swinging movement of the bracket 35 relative to the adaptor bracket 36 when the keyhole tenon 79 is received in the mortise 75.

For engaging and holding the L-shaped bracket 35 when the tenon 79 thereon is engaged in either of the mortises 75 or 76, to rigidly support the mounting bracket 35 with respect to the wall on which the adaptor bracket 36 is mounted, the adaptor bracket is provided with a plurality of tongue and groove members for cooperatively engaging with either the tongue 41 and associated groove 51 on the longer leg of the L-shaped bracket or the tongue 42 and groove 52 on the shorter leg of the L-shaped bracket 35. For this purpose, the adaptor bracket 36 is provided with an upstanding panel section 80 adjacent the flange 71 and C-shaped member 78, which panel terminates at its outer end in a reverse turned tongue 81 defining, with the panel section 80, a channel 82. When the tenon 79 is positioned in the mortise 76, the tongue 41 is positioned in adaptor bracket groove 82 and the bracket tongue 81 slides into the mounting bracket groove 51, as shown in FIG. 5. alternatively, when the keyhole tenon 79 is engaged in mortise 76, the mounting bracket tongue 42 is positioned in the adaptor bracket groove 82 with the adaptor bracket tongue 81 positioned in the groove 52 in the shorter leg of the mounting bracket, as shown in FIG. 6.

Further tongue and groove structures are provided on the adaptor bracket for providing essentially an additional three levels of adjustment. It should be understood, of course, that additional adjustment levels may be provided in order to accomodate the bracket system to more curved surfaces. The mounting bracket is positioned in a selected one of the tongue and grooves by cutting away those tongue and groove sections not required. To this end, the brackets are made of strong, light, but easily workable material, such as an aluminum extrusion.

Figure 7A:
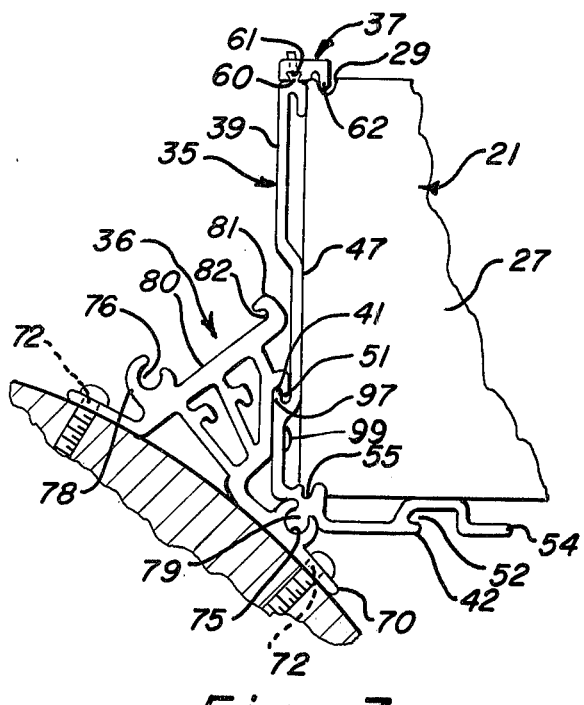
FIGS. 7a, 7b and 7c illustrate the bracket system embodying the brackets shown in FIGS. 1, 2 and 3 mounting a roll-up awning box on a curved surface having an average slope varying between about 30° and about 75° with respect to the horizontal.
Figure 7B:
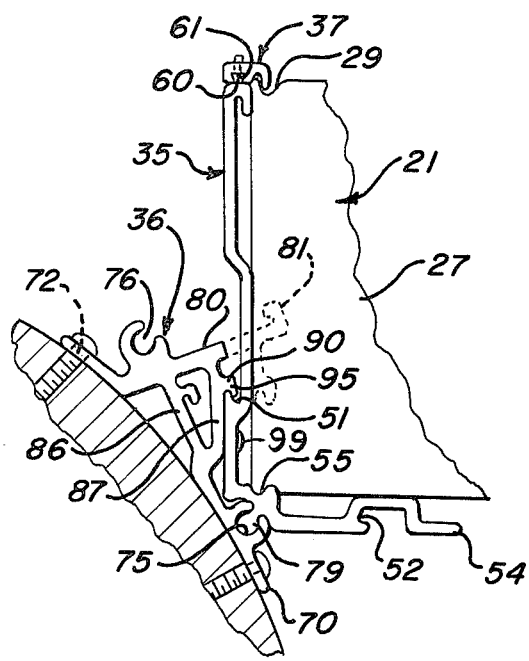
Figure 7C:
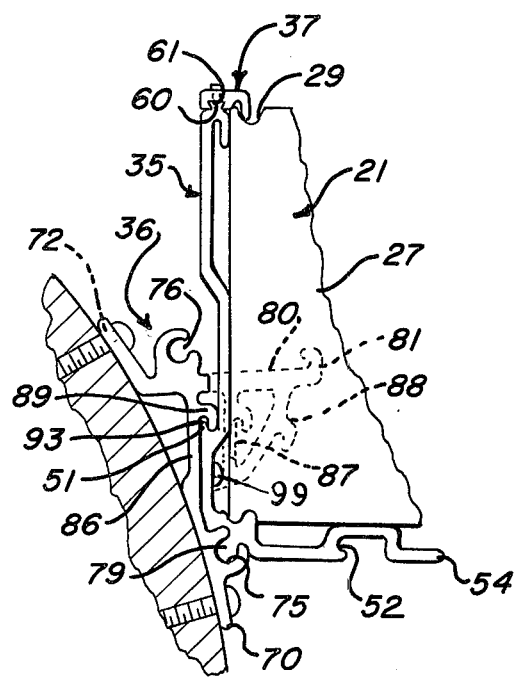

Turning more specifically to the construction of the adaptor bracket 36, a second upstanding panel 85 is provided adjacent the flange 70 and positioned approximately parallel to the first panel section 80. A plurality of intermediate transverse panels 86, 87, 88 each spaced from the other, extend between the upstanding panels 80 and 85 in a generally ladder-like effect. Each of the transverse panels 86, 87, 88 is provided with an L-shaped member 89, 90, 91, respectively, opening towards the mortise 75 and each being radially equidistant therefrom. The L-shaped member 89 defines with its associated transverse panel 86 a tongue 92 and groove 93; L-shaped member 90 defines with its associated panel 87 a tongue 94 and groove 95; and L-shaped member 91 defines with its associated panel 88 a tongue 96 and groove 97. The various tongue and groove configurations thus described are adapted to receive either the mounting bracket tongue 41 or the mounting bracket tongue 42 when the mounting bracket tenon 79 is positioned in the mortise 75. With reference to FIG. 7a, 7b and 7c, the keyhole tenon 79 on the mounting bracket 35 is positioned in the mortise 75 while the tongue 41 on the longer leg 39 is positioned in a selected one of the adaptor bracket grooves 93, 95 or 97, such as the upper or outer groove 97 (FIG. 7a), the middle or intermediate groove 95 (FIG. 7b) or the bottom or lower groove 93 (FIG. 7c). It will be appreciated that, in the latter two positions, it is necessary for the user to cut away the interfering portions of the adaptor bracket by severing the upstanding panels 80, 85 at a point just above the transverse panel carrying the L-shaped member to be utilized.

Similarly, to obtain still further angular adjustments, the keyhole tenon 79 of the mounting bracket 35 is positioned in the mortise 75 with the tongue 42 of the shorter leg 40 positioned in a selected one of the tongue and groove devices formed by the L-shaped members 89, 90, 91 on the adaptor bracket. FIGS. 8a, 8b, and 8c illustrate the respective positions wherein the tongue 42 of the mounting bracket is selectively positioned respectively in grooves 97, 95 or 93.

To summarize the use of the bracket organization herein described for mounting a roll-up awning box or housing on a wall, such as a curved wall of a recreational vehicle, the adaptor bracket 36 and associated mounting bracket 35 are positioned on the side of the vehicle, utilizing a selected mortise and tenon joint together with a selected tongue and groove joint which are such that the mounting bracket will support the awning box or housing in a generally upright position with the housing base generally horizontal and the housing back generally vertical. Because of the number of adjustment positions available with the bracket structures described above, it will ordinarily be possible to position the roll-up awning housing or box in the correct position on most if not all vehicles. Unnecessary portions of the adaptor bracket and/or mounting bracket are cut away, as shown in dotted lines in the drawings. The adaptor bracket is then secured to the vehicle wall at the desired point. Two or more bracket systems are generally used, depending upon the length of the awning structure. When the adaptor bracket has been secured to the wall, the mounting bracket is slid into place and secured with respect to the adaptor bracket by appropriate self-tapping or set screws 99. The awning housing or box is then mounted on the L-shaped mounting bracket 35 in the manner described above. As can be readily observed, the installation is simple and yet provides a stronge, rugged mounting system readily adaptable for a wide variety of surface curve configurations on recreational vehicles.

While a certain illlustrative bracket organization has been shown in the drawings and described in considerable detail, it should be understood that there is no intention to limit the invention to the specific form disclosed. On the contrary, the intention is to cover all modifications, alternative constructions, equivalents and uses falling within the spirit and scope of the invention as expressed in the appended claims.

I claim:

1. A bracket system for mounting a roll-up awning housing on a convexly curved wall surface of a recreational vehicle, comprising a mounting bracket adapted to be secured to the awning housing, an adaptor bracket interengaged with said mounting bracket and including concave mounting means adapted to be mounted on said curved recreational vehicle surface, and selectively engageable means on said adaptor bracket and said mounting bracket including a plurality of keyhole tenon and mortise joints and a plurality of tongue and groove joints, a pair of joints including one tenon and mortise joint and one tongue and groove joint being selectable according to the curved surface on which said bracket system is mounted for engaging and holding said mounting bracket on said adaptor bracket with said awning housing in a generally upright operative position.

2. A bracket system for mounting an awning housing on a recreational vehicle having a convexly curved mounting wall, comprising a generally L-shaped mounting bracket, means for mounting said awning housing on said L-shaped mounting bracket, said mounting bracket having legs meeting at an apex, each of said legs having an inner surface and an outer surface, a keyhole tenon extending transversely of said mounting bracket the apex thereof adjacent the outer surfaces of said legs, tongue and groove means on the outer surface of each of said legs and spaced from said tenon; an adaptor bracket interengaged with said mounting bracket and including means defining a concavely curved mounting surface adapted to be positioned against and mounted on said convexly curved recreational vehicle wall, means defining a plurality of keyhole mortises on said adaptor bracket, and means defining a plurality of tongue and groove means on said adaptor bracket, whereby said mounting bracket is interengaged with said adaptor bracket by the insertion of said mounting bracket tenon in a selected one of said mortises and by the engagement of a selected tongue and groove means on said mounting bracket in a selected one of said tongue and groove means on said adaptor bracket, thereby positioning said mounting bracket relative to said adaptor bracket for supporting said awning housing in a generally upright operative position when said adaptor bracket is mounted on the curved surface of a recreational vehicle.

3. A mounting bracket for supporting a housing enclosing a roll-up type awning and for engaging a housing clamp for securely holding the housing thereon, said mounting bracket comprising a generally L-shaped member having a shorter leg and a longer leg joined at an apex, each of said legs having an inner and an outer surface defining an inner and an outer side of said bracket respectively, inset means on each of said legs defining a tongue and groove means on the outer surface of each of said legs, a keyhole tenon adjacent said apex at the outer side of said bracket, means defining a transverse groove adjacent said apex at the inner side of said bracket, said groove opening in a direction generally parallel to the plane of said longer leg, said longer leg having an inturned portion at its outer end, and a dovetail tenon defined on the outer end of said longer leg for receiving said housing.

4. A mounting bracket as defined in claim 3 wherein said inturned portion of the outer end of said longer leg includes a reverse bend portion directed towards and lying generally in the plane of the inset means on said longer leg.

5. A mounting bracket as defined in claim 3 wherein said tongue and groove means are directed away from said keyhole tenon.

6. A bracket system for mounting an elongated generally rectangular awning housing on a recreational vehicle having a convexly curved mounting wall, comprising a generally L-shaped mounting bracket, means for mounting said awning housing on said L-shaped mounting bracket, said mounting bracket having a shorter leg and a longer leg meeting at an apex, each of said legs having an inner surface and an outer surface defining an inner side and an outer side of said bracket respectively, a keyhole tenon extending transversely of said mounting bracket at the apex of the outer side of the bracket, tongue and groove means on the outer surface of each of said legs and spaced from said tenon; an adaptor bracket interengaged with said mounting bracket and including spaced arcuate flanges defining a concavely curved mounting surface adapted to be positioned against and mounted on said convexly curved recreational vehicle wall, fastener receiving aperture means defined on said flanges adjacent the outer ends thereof, an upstanding panel section integral with the inner end of each of said flanges and extending away from the convex surface defined thereby, a plurality of generally transverse panels extending between said panel sections, means defining a keyhole mortise adjacent each flange, each of said transverse panels lying in spaced, generally radial planes with respect to one of said keyhole mortises, and means on said panels and panel sections defining tongue and groove elements, one of the tongue and groove means on said mounting bracket being received in a selected one of said tongue and groove elements on said adaptor bracket when said keyhole tenon is inserted in a selected keyhole mortise on said adaptor bracket, thereby positioning said mounting bracket for supporting said awning housing in a generally upright operative position when said adaptor bracket is mounted on the curved surface of a recreational vehicle.

7. A bracket system as defined in claim 6 including means for fastening said mounting bracket in engagement with said adaptor bracket when said brackets are interengaged in the selected position.

8. A bracket system for mounting an awning housing on a recreational vehicle having a convexly curved mounting wall, comprising a generally L-shaped mounting bracket, means for mounting said awning housing on said L-shaped mounting bracket including a tongue on said mounting bracket engageable with groove means defined on said housing and a bracket clamp for holding said awning housing on said mounting bracket and defining a tongue engageable with a groove on said awning housing, and said clamp further defining a mortise interengaged with a dovetail tenon on said mounting bracket to provide a dovetail tenon and mortise joint between said clamp and said mounting bracket, an adaptor bracket interengaged with said mounting bracket and including means defining a concavely curved mounting surface adapted to be positioned against and mounted on said convexly curved recreational vehicle wall, means on said mounting bracket and said adaptor bracket defining an interengaging mortise and tenon joint, and means on said mounting bracket and said adaptor bracket defining an interengaging tongue and groove means spaced from said mortise and tenon joint means, said tongue and groove means and said mortise and tenon joint means coupling and holding said mounting bracket and said adaptor bracket together for supporting said awning housing in a generally upright operative position on said recreational vehicle wall when said awning housing is mounted on said L-shaped mounting bracket.

9. An adaptor bracket for engaging and supporting a mounting bracket as defined in claim 3, comprising spaced arcuate flanges defining a concavely curved mounting surface adapted to be positioned against and mounted on a convexly curved recreational vehicle wall, fastener receiving aperture means defined on said flanges adjacent the outer ends thereof, an upstanding panel section integral with the inner end of each of said flanges and extending away from the convex surface defined thereby, a plurality of generally transverse panels extending between said panel sections, means defining a keyhole mortise adjacent each flange, each of said transverse panels lying in spaced, generally radial planes with respect to one of said keyhole mortises, and means on said panels and panel sections defining tongue and groove elements, one of the tongue and groove means on said mounting bracket being received in a selected one of said tongue and groove elements on said adaptor bracket when said keyhole tenon is inserted in a selected keyhole mortise on said adaptor bracket for positioning said mounting bracket for supporting said awning housing in a generally upright operative position when said adaptor bracket is mounted on the curved surface of a recreational vehicle.

* * * * *